July 29, 1969 J. V. CALISHER 3,458,850
ELECTRICAL CONNECTOR ASSEMBLY
Filed Oct. 23, 1965

INVENTOR.
JAY V. CALISHER
BY
Paul A. Weilein
ATTORNEY

INVENTOR.
JAY V. CALISHER

BY
Paul A. Weilein
ATTORNEY

United States Patent Office 3,458,850
Patented July 29, 1969

3,458,850
ELECTRICAL CONNECTOR ASSEMBLY
Jay V. Calisher, Montebello, Calif., assignor to E. B. Wiggins Inc., Los Angeles, Calif., a corporation of California
Filed Oct. 23, 1965, Ser. No. 503,459
Int. Cl. H01r 13/62, 13/54
U.S. Cl. 339—45
9 Claims

ABSTRACT OF THE DISCLOSURE

The connector comprises: a first connector body having an external screw thread; a second connector body to mate with the first connector body; an internally threaded coupling sleeve rotatable to engage said screw thread of the first connector body; means to releasably lock the coupling sleeve to the second connector body when the coupling sleeve is engaged with said screw thread thereby to interlock the two connector bodies; a driving sleeve; and cooperating means on said driving sleeve and said coupling sleeve, respectively, engageable to rotate the coupling sleeve in response to rotation of the driving sleeve, said cooperating means being disengageable to permit separation of the coupling sleeve from the driving sleeve. The driving sleeve is rotatably mounted on the second connector body and is axially retractable from a normal forward position to release the locking means. To assemble the connector, the coupling sleeve is positioned initially on the second connector body and the driving sleeve is manually rotated to screw the coupling sleeve onto the first connector body thereby transferring the coupling sleeve to the first connector body. With the coupling sleeve screwed onto the first connector body, the two connector bodies may be interlocked by locking the coupling sleeve to the second connector body. Thereafter, the driving sleeve may be retracted to unlock the second connector body from the coupling sleeve to permit separation of the two connector bodies with the coupling sleeve left on the first connector body.

---

This invention relates to an electrical connector assembly of the quick disconnect type.

It is an object of this invention to provide a quick disconnect electrical connector wherein a pair of tubular connector members that are adapted to be connected to conduits or tubing for electrical conductors, are of such novel construction that they may be readily coupled to one another to electrically interengage contact elements carried thereby when a pair of rotative portions on one of the connector members are rotated to threadedly connect one of such rotative portions to the other connector member. This threading of the two connector members to one another causes the connector members to be drawn together so as to force the contact elements into the desired engagement with one another. Novel means are provided for quick disconnection of the connector members in response to a predetermined and quickly effected axial movement of the other of the rotative portions of the pair thereof.

It is a further object of this invention to provide an electrical connector such as next above described wherein the rotative portion on one of the connector members that is threadedly connected to the other of the pair of connector members, will remain in screw threaded connection therewith when the means for quickly disconnecting the connector members is actuated. The rotative screw threaded portion that remains on one of the connecting members may be removed therefrom when it is desired to reassemble the two rotative portions for a subsequent connection and disconnection of the two connector members.

Further it is an object of this invention to provide an electrical connector assembly such as described wherein the aforementioned pair of rotative portions on one of the connector members consist of a driving sleeve and a coupling sleeve. These sleeves are releasably held in operative relation by novel locking means so that rotation of the driving sleve will effect rotation of the coupling sleeve to connect the latter to the other connector member of the pair. The driving sleeve is moved axially for releasing the locking means, upon pulling on a lanyard member connected to the driving sleeve. Continued pulling on the lanyard member will bring about complete separation of the connector members, the coupling sleeve remaining on the connector member to which it was threadedly connected.

Other objects and advantages of the invention will be hereinafter described or will become apparent to those skilled in the art, and the novel features of the invention will be defined in the appended claims.

Referring to the drawing.

Figure 1:
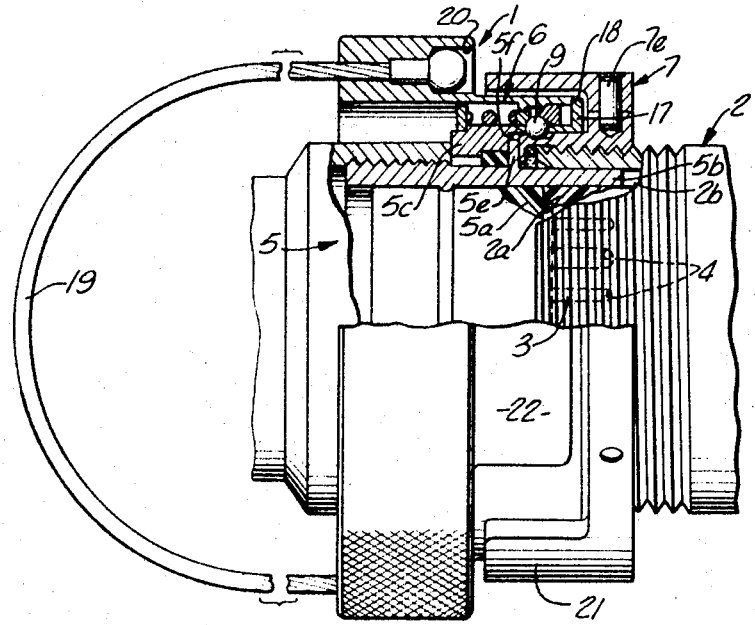
FIG. 1 is a fragmentary part sectional and part elevational view of an electrical connector assembly embodying the present invention as it would appear when the separable parts thereof are in coupled relation.

As shown in the accompanying drawing, an electrical connector assembly embodying the present invention includes a pair of tubular connector members 1 and 2 adapted to be connected to conduits (not shown) and electrical conductors also not shown. The connector member 1, for example, is the plug or male connector carrying contact elements 3 adapted to interengage contact elements 4 on the female or socket connector member 2.

The plug or male connector 1 comprises a sectional tubular body 5 in which is held a conventional center portion 5a of insulation material for supporting contact elements 3. A similar insulation body 2a is mounted in the female connector member 2 for supporting contact elements 4 in position to engage the contact elements 3 when the connector members are coupled to one another.

The inmost tubular section 5b of the body 5 as shown in FIG. 1 is adapted to extend into the tubular female connector member 2 so as to occupy the annular space 2b between the inner surface of the tubular member 2 and the insulation body 2a. The tubular coupling member 2 and the inner section 5b of the tubular member 1 may be provided with conventional axially extending rib and groove guiding elements, not shown, which assure that the body section 5b can be inserted into the member 2 only when the contact elements 3 and 4 are aligned for the desired interengagement thereof.

The plug or male connector member 1 has mounted thereon a pair of tubular portions which constitute a rotary driving sleeve 6 and a rotary coupling sleeve 7. The coupling sleeve 7 has internal screw threads 7a and is disposed so that it may be threaded onto the screw threads 8 on the exterior of the connector member 2.

The driving sleeve 6 surrounds the outermost tubular body section 5c, and is freely rotatable and capable of limited axial movement in one direction. The body section 5c has at one end a flange 5d which extends outwardly and angularly with the outer end thereof contacting the inner surface of the driving sleeve 6, there being a shoulder 6a interiorly of the sleeve 6 engageable with the outer end of the flange 5d to hold the sleeve against axial forward movement but permitting limited axial movement of the sleeve in the opposite direction for the purpose to be hereinafter described.

The outer body section 5c is held in assembled relation with the other portions of the body 5 by means of a flange 5e on the inner body section 5b and which abuts a shoulder 5f on the outer section 5c. The inner end of the outer section 5c abuts an end of a tubular body section 5g, the section 5b being threadedly engaged with the section 5g. A sealing ring 5h may be provided between the body section 5b and the outer body section 5c with the ring disposed in contact with the flange 5e.

The coupling sleeve 7, as here shown, includes inner and outer annular portions 7b and 7c having abutting flanges 7d at their outer ends. These flanges are joined for example by means of the pins 7e so that an annular recess R is formed in the sleeve 7. It is to be understood that the coupling sleeve 7 may be made as one piece instead of with the two pieces as here shown. The outer annular portion 7c surrounds the driving sleeve 6 in circumferentially spaced relation thereto. The inner annular portion 7b at one end thereof is provided with a flange 7f which is adapted to abut the flange 5e on the inner body section 5b when the coupling sleeve 7 is properly assembled with the driving sleeve 6, as shown in FIGS. 1 and 4.

Locking means are provided to releasably hold the coupling sleeve 7 in operative association with the driving sleeve 6 and against axial movement relative to the body section 5c. Release of the locking means to permit separation of the coupling sleeve 7 from the driving sleeve 6 is effected upon axial movement of the driving sleeve in a manner which will be hereinafter described.

Figure 4:
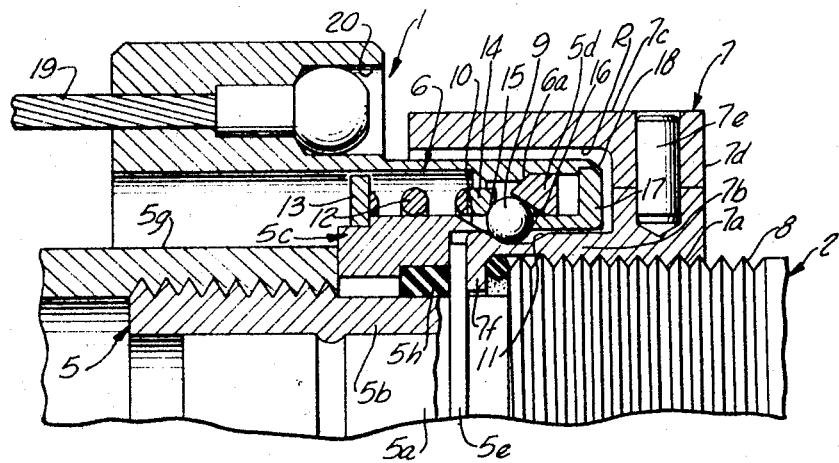
FIG. 4 is an enlarged fragmentary sectional view of the connector assembly with the parts thereof in fully coupled relation as shown in FIG. 1.

As best seen in FIG. 4, the locking means includes a plurality of balls 9 which are movable through openings 10 in the flange 5d for engaging in depressions 11 in the inner portion 7b of the coupling sleeve 7. When the balls 9 are engaged in the depression 11 the coupling sleeve 7 is held against axial movement relative to the body section 5d and the driving sleeve 6. As a means for urging the balls 9 into the depression 11, a coiled spring 12 is mounted in surrounding relation to the body section 5c. One end of this spring abuts a ring 13 which is press fitted on the body member 5c so as to be securely retained thereon. The other end of the spring 12 abuts a ring 14 which has a bevelled face 15 for engaging the balls 9 to urge them into the depressions 11. A bevelled face 16 on the flange 5d serves to guide the balls into the depressions 11 as well as out of the depressions.

Figure 5:
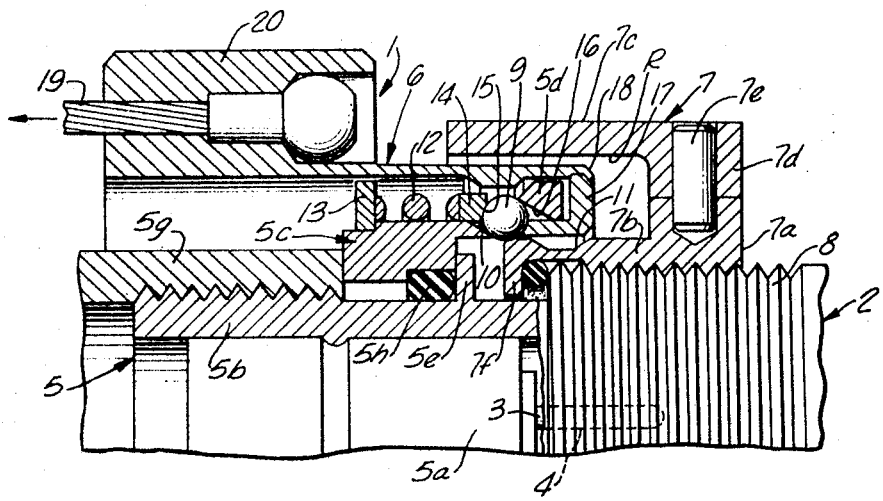
FIG. 5 is a fragmentary enlarged sectional view similar to FIG. 4 but showing parts thereof partially separated and subject to being fully detached from one another.

As a means for forcing the balls 9 out of the depressions to release the coupling sleeve 7, the driving sleeve 6 is provided with an angular flange portion 17 which will engage thte balls 9 and force them out of the depressions 11 into the position shown in FIG. 5 when the driving sleeve 6 is moved axially to the extent indicated in FIG. 5. The annular and angularly extended flange portion 17 is here shown as secured to the sleeve 6 by crimping the end of the sleeve as at 18 to hold the flange portion 17 properly united with the driving sleeve 6. In this connection it should be noted that the annular flange portion 17 may be formed as an integral part of the sleeve 6 if this is desired.

Means are provided for effecting axial movement of the driving sleeve 6 so that the annular and angular flange portion 17 of the driving sleeve will engage the balls 9 and move them against the action of the spring 12 into the releasing position shown in FIG. 5. This means consists of a lanyard 19 which is fastened to socket portions 20 on the driving sleeve 6 so that the lanyard forms a loop as shown in FIG. 1.

When the driving and coupling sleeves are assembled as shown in FIGS. 1 and 4, upon rotation of the driving sleeve 6, arcuate lugs 22 thereon and spaced from one another will engage arcuate flanges of the coupling sleeve 7 so that the latter will be rotated when the driving sleeve is rotated. This rotation of the coupling sleeve is effected when the connector members 1 and 2 are positioned so that the contact elements 3 and 4 thereon are aligned and the threads on the coupling sleeve 7 are in a position to engage the threads 8 on the connector member 2. It should be noted that the spacing of the flanges 21 and the lugs 22 is such that the two connector members may be relatively moved as required to align the contact elements before the driving sleeve 6 upon rotation will also rotate the coupling sleeve 7.

Figure 3:
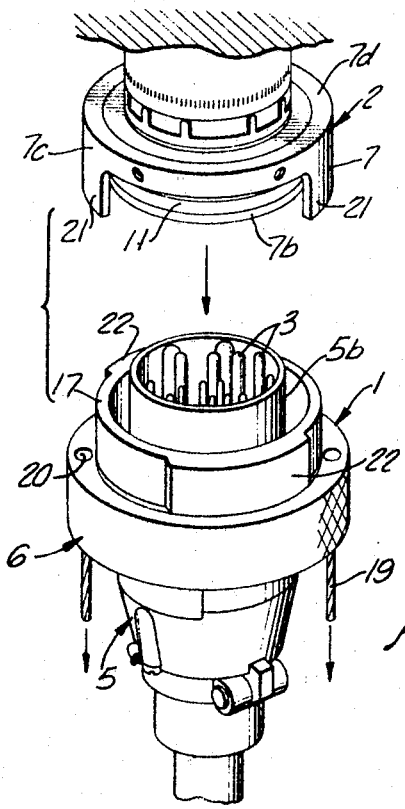
FIG. 3 is a fragmentary perspective view of the connector assembly as when separable parts thereof are detached from one another.

When the connector members are properly coupled as shown in FIGS. 1 and 4, and it is desired to uncouple them so that the coupling sleeve 7 will remain on the connector member 2, as indicated in FIG. 3, the lanyard 19 is pulled to move the driving sleeve 6 axially so that the flange portion 17 connected to the driving sleeve will engage the balls 9 and move them out of the depressions 11 against the action of the spring 12 into position shown in FIG. 5, for freeing the coupling sleeve 7. Continued pull on the lanyard 19 will separate the connector members 1 and 2, as shown in FIG. 3.

Figure 2:
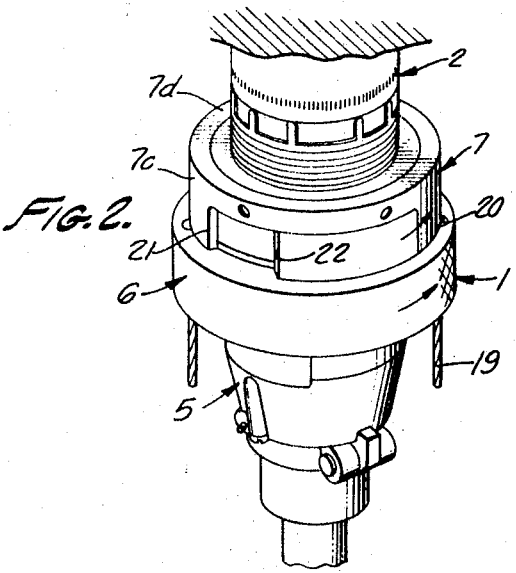
FIG. 2 is a fragmentary perspective view of the electrical connector assembly as it would appear with the parts thereof in partially coupled relation and subject to being further manipulated to complete the coupling thereof.

One of the advantages of this invention is that with the connector member 2 mounted in a confined space as on a wall, as indicated in FIGS. 2 and 3, an operator may readily effect a releasable locking of the connector members together by merely rotating the driving sleeve 6 when the contact elements of the two connector members are aligned. FIG. 2 shows how this operation is effected with the coupling sleeve partially threaded onto the connector member 2. Continued rotation of the driving sleeve in the direction of the arrow shown in FIG. 2 will rotate the coupling sleeve 7 until it is completely threaded onto the connector member 2, as shown in FIG. 1, the coupling sleeve being then disposed on the connector member 2, as shown in FIG. 2. As hereinabove stated, the connector members 1 and 2 readily may be separated so that the coupling sleeve remains on the member 2 by pulling on the lanyard 19.

When it is desired to reassemble the coupling sleeve 7 with the driving sleeve 6, the coupling sleeve may be unscrewed from the connector member 2 and then pushed into engagement with the driving sleeve an extent which will permit the locking balls 9 to snap into the depressions 11 and lock the two sleeves together. If desired, the coupling sleeve may be unscrewed from the connector member 2 so that only the last few screw threads hold the member 7 in place and the connector member 1 may then be moved into engagement with the coupling sleeve 7 so that the driving sleeve will project into the annular recess R formed between inner and outer tubular portions 7b and 7c of the member 7, sufficiently to cause the locking balls 9 to snap into the depressions 11 in the sleeve 7.

From the foregoing description it is apparent that a first connector body 2 has external screw threads 8 and that the tubular body sections 5g and 5c constitute a second connector body with a flange portion 5d shaped and dimensioned to overhang and surround the screw threads 8 of the first connector body. It is further apparent that the driving sleeve 6 which is rotatably mounted on the second connector body is formed with a rearwardly facing annular space enclosing the flange portion 5d of the second connector body and that the coupling sleeve 7 is formed with an annular recess to receive the leading end of the locking sleeve.

While specific structural details have been shown and described, it should be understood that changes and alterations may be resorted to without departing from the spirit of the invention as defined in the appended claims.

I claim:
1. An electrical connector assembly, comprising: a pair of tubular connector members; electrical contact elements carried by said connector members so as to be interengaged upon coupling said connector members to one another; one of said connector members having screw threads thereon; a coupling sleeve having screw threads engageable with said screw threads of said one connector member and releasably engageable with said other connector member to interlock the two connector members; a driving sleeve mounted on said other connector member for rotation relative thereto; means on said driving and coupling sleeves respectively cooperable for rotating said coupling sleeve in response to rotation of said driving sleeve; said coupling sleeve upon being screwed onto said one connector member operating to move said connector members toward one another to effect said interengagement of said contact elements; means to releasably lock said coupling sleeve to said other connector member; and said coupling sleeve being releasable from said other of said connector members and from said driving sleeve to permit the coupling sleeve to be transferred from said other connector member to said one connector member, whereby said driving sleeve may function as means for manually manipulating the coupling sleeve to mount the coupling sleeve on said one connector member.

2. The electrical connector assembly as seet forth in claim 1, including means to release said coupling sleeve from said other connector member in response to movement of said driving sleeve relative to said other connector member.

3. The electrical connector assembly as set forth in claim 2 in which said driving sleeve is axially movable relative to said other connector member to release said coupling sleeve from said other connector member.

4. The electrical connector assembly as set forth in claim 1, including locking means releasably holding said coupling sleeve on said other connector member; said driving sleeve axially movable relative to said other connector member; means for operating said locking means to release said coupling sleeve upon axial movement of said driving sleeve; and a member connected to said driving sleeve operable when pulled to effect said axial movement of said driving sleeve for operating said locking means to effect said release of said coupling sleeve.

5. The electrical connector assembly as set forth in claim 1, wherein said other connector member includes a tubular body; said driving sleeve surrounding said body; means holding said driving sleeve on said body and permitting axial movement of said driving sleeve relative to said body; locking means carried by said body releasably holding said coupling sleeve against axial movement relative to said body; means operable upon axial movement of said driving sleeve to release said coupling sleeve from said body; and a lanyard connected to said driving sleeve operable to effect said axial movement of said driving sleeve.

6. A connector assembly, comprising a pair of tubular connector members; one of said connector members having screw threads thereon; a rotatable screw threaded coupling sleeve engageable with the screw threads of said one connector member; a driving sleeve mounted on said other connector member for axial and rotative movement relative thereto; means on said driving and coupling sleeves, respectively, cooperable for rotating said coupling sleeve in response to rotation of said driving sleeve; said rotatable coupling sleeve being disposed for threaded engagement with said screw threads on said one connector member; locking means for releasably holding said coupling sleeve against axial movement relative to said other connector member thereby to interlock the two connector members when the coupling sleeve is in threaded engagement with said one connector member, said locking means being effective to releasably hold the coupling sleeve against axial movement relative to said driving sleeve while permitting rotation of said driving and coupling sleeves; and means operable in response to axial movement of said driving sleeve to release said locking means and permit separation of said connector members and separation of said coupling sleeve from said other connector member when said coupling sleeve is screwed onto said one connector member.

7. A connector assembly, comprising: a pair of tubular connector members adapted to be releasably coupled to one another; one of said connector members having screw threads thereon; a screw threaded coupling sleeve rotatably mounted on the other of said connector members; said other connector member including a tubular body; a driving sleeve mounted on said body for rotation and axial movement relative to said body; said driving sleeve having an annular recess therein; said driving sleeve having an annular flange portion projecting radially inwardly from one end thereof; said body having an annular portion having openings therein; locking balls carried by said annular portion of said body for movement in said openings; said coupling sleeve having depressions therein to receive said balls so as to lock said coupling sleeve to said annular portion of said body; spring means on said annular portion of said body urging said balls in said openings to enter said depression; said annular and radially extending flange portion of said driving sleeve and a portion of said driving sleeve being extended into said recess when said balls engage said depression to lock said coupling sleeve to said body and said driving sleeve; said coupling sleeve extending outwardly beyond said driving sleeve for threaded engagement with the threads on said one connector member; a lanyard connected with said driving sleeve and operable when pulled to move said driving sleeve axially whereby said flange portion of said driving sleeve will engage said balls and move them out of locking engagement with the depression on said coupling sleeve to release said coupling sleeve when said coupling sleeve is threaded onto said one connector member.

8. A releasable connector assembly, comprising: a first connector body having an external screw thread; a second connector body to mate with the first connector body; a coupling sleeve rotatable to engage said screw thread of the first connector body; a driving sleeve; means to releasably lock said coupling sleeve to said second connector body when the coupling sleeve is engaged with said screw thread thereby to interlock the two connector bodies, said driving sleeve being rotatably mounted on said second coupling body and being axially retractable from a forward position to release said locking means; and cooperative means on said driving sleeve and said coupling sleeve, respectively, engageable to rotate the coupling sleeve in response to rotation of the driving sleeve, said cooperative means being disengageable to permit separation of the coupling sleeve from the driving sleeve, whereby with the driving sleeve engaged with the coupling sleeve, the driving sleeve may be rotated manually to screw the coupling sleeve onto the first connector body and thereafter the two connector bodies may be separated with the coupling sleeve left on the first connector body.

9. A releasable connector assembly comprising: a first tubular connector body having an external screw thread; a second connector body shaped and dimensioned to mate with the first connector body, said second connector body having a forwardly extending flange portion shaped and dimensioned to overhang and surround the leading end of said first connector body with radial clearance; a driving sleeve rotatable on the second connector body with its leading end formed with a rearwardly facing annular space to receive said flange portion of the second connector body; a coupling sleeve internally threaded to engage said external screw thread of the first connector body, said coupling sleeve being formed with an annular recess to receive said leading end of the driving sleeve and said flange portion therein, the inner circumferential portion of said recess of the coupling sleeve having interlocking recess means; locking elements carried by said flange portion to releasably engage said locking recess means to lock the coupling sleeve to the second connector body, said locking elements being biased to locking position, said driving sleeve being movable relative to the second connector body to force the locking elements to their release positions, and cooperative means on said driving sleeve and said coupling sleeve respectively engageable to rotate the coupling sleeve in response to rotation of the driving sleeve, said cooperative means being disengageable to permit separation of the coupling sleeve from the driving sleeve, whereby the driving sleeve may be rotated to screw the coupling sleeve onto the first connector body and the coupling sleeve may then be locked to the second connector body to interconnect the two connector bodies and subsequently the two connector bodies may be disconnected with said coupling sleeve left on the first coupling body by manipulating the driving sleeve to force said locking elements to release positions.

References Cited

UNITED STATES PATENTS

| | | | |
|---|---|---|---|
| 2,409,650 | 10/1946 | Wiggins | 339—91 X |
| 2,847,652 | 8/1958 | Kokalas. | |
| 3,063,032 | 11/1962 | Brush. | |
| 3,071,188 | 1/1963 | Raulins | 285—34 X |
| 3,156,612 | 11/1964 | Peterson et al. | |

MARION A. CHAMPION, Primary Examiner

PATRICK A. CLIFFORD, Assistant Examiner

U.S. Cl. X.R.

339—91

PO-1050
(5/69)

UNITED STATES PATENT OFFICE
CERTIFICATE OF CORRECTION

Patent No. 3,456,850      Dated July 29, 1969

Inventor(s) Jay V. Calisher

It is certified that error appears in the above-identified patent and that said Letters Patent are hereby corrected as shown below:

Column 5, line 39, --being-- should be inserted before "axially".

SIGNED AND
SEALED
DEC 23 1969

(SEAL)
Attest:

Edward M. Fletcher, Jr.
Attesting Officer

WILLIAM E. SCHUYLER, Jr.
Commissioner of Patents